United States Patent
Chang

(10) Patent No.: US 10,721,277 B2
(45) Date of Patent: *Jul. 21, 2020

(54) DEVICE PAIRING TECHNIQUES USING DIGITAL WATERMARKING

(71) Applicant: Google LLC, Mountain View, CA (US)

(72) Inventor: Mark Chang, Seattle, WA (US)

(73) Assignee: Google LLC, Mountain View, CA (US)

(*) Notice: Subject to any disclaimer, the term of this patent is extended or adjusted under 35 U.S.C. 154(b) by 90 days.

This patent is subject to a terminal disclaimer.

(21) Appl. No.: 16/200,561

(22) Filed: Nov. 26, 2018

(65) Prior Publication Data

US 2019/0166166 A1    May 30, 2019

Related U.S. Application Data

(63) Continuation of application No. 15/212,696, filed on Jul. 18, 2016, now Pat. No. 10,142,374.

(51) Int. Cl.
| | |
|---|---|
| *H04L 12/18* | (2006.01) |
| *H04W 88/08* | (2009.01) |
| *G06K 7/10* | (2006.01) |
| *H04W 8/00* | (2009.01) |
| *H04L 29/06* | (2006.01) |

(Continued)

(52) U.S. Cl.
CPC .......... *H04L 65/1059* (2013.01); *G06F 21/16* (2013.01); *G06F 21/44* (2013.01); *G06K 7/10544* (2013.01); *H04L 12/1818* (2013.01); *H04L 65/1069* (2013.01); *H04L 65/403* (2013.01); *H04L 67/146* (2013.01); *H04L 67/42* (2013.01); *H04N 7/147* (2013.01);

(Continued)

(58) Field of Classification Search
CPC ............. H04L 65/1059; H04L 12/1818; H04L 65/1069; H04L 67/146; H04L 67/42; G06K 7/10544; H04W 88/08

See application file for complete search history.

(56) References Cited

U.S. PATENT DOCUMENTS

| | | | |
|---|---|---|---|
| 2003/0009673 A1 | 1/2003 | Hayashi et al. | |
| 2004/0246332 A1* | 12/2004 | Crouch | H04L 12/1822 348/14.08 |

(Continued)

OTHER PUBLICATIONS

USPTO, Notice of Allowance for U.S. Appl. No. 15/212,696, dated Jul. 18, 2018, 9 Pages.

(Continued)

*Primary Examiner* — Thien M Le
*Assistant Examiner* — Asifa Habib
(74) *Attorney, Agent, or Firm* — IP Spring

(57) ABSTRACT

Computer-implemented techniques include detecting, using a camera of a computing device having one or more processors, a digital watermark displayed by a display of a computing system. The digital watermark can be a visual indicator that is detectable by the camera of the computing device, and the computing system can further comprise a set of speakers and a set of cameras. The techniques can include determining, by the computing device, a unique identifier for the computing system based on the digital watermark. The techniques can also include automatically coordinating, by the computing device, an audio/video conference session between the computing device and the computing system using the unique identifier.

20 Claims, 2 Drawing Sheets

(51) Int. Cl.
*H04L 29/08* (2006.01)
*G06F 21/16* (2013.01)
*G06F 21/44* (2013.01)
*H04N 7/14* (2006.01)

(52) U.S. Cl.
CPC ..... *H04W 88/08* (2013.01); *G06F 2221/2129* (2013.01); *H04L 63/104* (2013.01); *H04W 8/005* (2013.01)

(56) References Cited

U.S. PATENT DOCUMENTS

| | | | |
|---|---|---|---|
| 2012/0162351 A1 | 6/2012 | Feldman et al. | |
| 2012/0198531 A1* | 8/2012 | Ort | H04W 12/06 726/7 |
| 2012/0224021 A1 | 9/2012 | Begeja et al. | |
| 2013/0057642 A1* | 3/2013 | Catchpole | H04L 12/1827 348/14.08 |
| 2013/0125224 A1* | 5/2013 | Kaufman | H04L 63/18 726/7 |
| 2014/0117073 A1* | 5/2014 | Bell | H04L 12/1818 235/375 |
| 2014/0208384 A1* | 7/2014 | Youssefian | H04L 63/0884 726/3 |
| 2014/0239057 A1* | 8/2014 | Galvin, Jr. | H04L 65/1069 235/375 |
| 2015/0055821 A1 | 2/2015 | Fotland | |
| 2015/0237143 A1 | 8/2015 | Sinn et al. | |
| 2015/0381938 A1* | 12/2015 | Cunico | H04N 7/157 348/14.1 |
| 2017/0293458 A1 | 10/2017 | Poel et al. | |
| 2017/0346851 A1* | 11/2017 | Drake | H04L 63/1466 |

OTHER PUBLICATIONS

USPTO, Non-final Office Action for U.S. Appl. No. 15/212,696, dated Mar. 28, 2017, 11 Pages.

USPTO, Non-Final Office Action for U.S. Appl. No. 15/212,696, dated Nov. 30, 2017, 6 Pages.

USPTO, Final Office Action for U.S. Appl. No. 15/212,696, dated Sep. 22, 2017, 13 Pages.

* cited by examiner

DEVICE PAIRING TECHNIQUES USING DIGITAL WATERMARKING

CROSS-REFERENCE TO RELATED APPLICATIONS

This application is a continuation of U.S. patent application Ser. No. 15/212,696, filed Jul. 18, 2016 and titled DEVICE PAIRING TECHNIQUES USING DIGITAL WATERMARKING, the contents of which are incorporated herein by reference in their entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Users can participate in audio/video conference sessions via their computing devices. Today, most users have mobile computing devices (e.g., mobile phones), and thus users may move locations during the audio/video conference session. In a workplace scenario, a particular user may begin the audio/video conference session in one location, such as at their desk, but they may later move to a different location, such as a conference room. The conference room can have a media system (a display, a set of speakers, etc.) associated therewith. The user, however, may be forced to manually configure the media system in order to utilize it for the audio/video conference session. This process can be time consuming and can interrupt the flow of the audio/video conference session.

SUMMARY

A computer-implemented technique is presented. A computing device and a non-transitory computer readable medium associated with operations of the computer-implemented technique are also presented. In one implementation, the technique can include detecting, using a camera of a computing device having one or more processors, a digital watermark displayed by a display of a computing system, the digital watermark being a visual indicator that is detectable by the camera of the computing device, the computing system further comprising a set of speakers and a set of cameras. The technique can include determining, by the computing device, a unique identifier for the computing system based on the digital watermark. The technique can also include automatically coordinating, by the computing device, an audio/video conference session between the computing device and the computing system using the unique identifier.

In some implementations, the computing system is a media system for a conference room, and the display is a non-smart display connected to an intermediate computing device that is configured as a wireless access point for the media system. In some implementations, the digital watermark is displayed during a standby mode of the media system during which the media system is not actively connected to other devices. In some implementations, the technique/operations can further comprise joining, by the computing device, the audio/video conference session prior to detecting the digital watermark, wherein coordinating addition of the media system to the audio/video conference session includes enabling the computing device to control the media system.

In some implementations, the digital watermark is a quick-response (QR) code that is not visible to a user of the computing device. In some implementations, the computing system is another computing device, and coordinating the audio/video conference session includes initiating, between the computing device and the other computing device, the audio/video conference session. In some implementations, the audio/video conference session is hosted by a remote server, and coordinating the addition of the media system to the audio/video conference session includes transmitting, from the computing device and to the remote server, the unique identifier, wherein receipt of the unique identifier causes the remote server to add the computing system to the audio/video conference session.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As mentioned above, the manual configuration of devices for participation in an audio/video conference session is time consuming. This can include two devices being configured to initiate an audio/video conference session or one device being configured to be added to an ongoing audio/video conference session with another device. Accordingly, device pairing techniques using digital watermarking are presented. These techniques provide for the seamless addition of devices to an audio/video conference session. The term "digital watermark" as used herein can refer to any indicator that is visible by a camera of an associated computing device to convey an audio/video conferencing unique identifier to the device. Examples of the digital watermark include, but are not limited to, barcodes and quick-response (QR) codes. In some implementations, the digital watermark may be visible to the computing device but not visible to human users, e.g., an infrared (IR) digital watermark.

In one scenario, a computing device has joined an audio/video conference session. When a user of the computing device enters a conference room, the user can point the computing device towards a digital watermark being displayed by a display of a media system (e.g., during a standby mode). A camera of the computing device can detect the digital watermark and determine a unique identifier for the media system. The computing device can then coordinate (e.g., via a remote server) the addition of the media system to the audio-video conference session. In some implementations, this can include giving the user control of the media system via their computing device. In another scenario, the camera of the computing device can detect a digital watermark being displayed on another computing device (e.g., another mobile phone). The computing device can determine the unique identifier and can coordinate (e.g., via the remote server) the initiation of the audio/video conference session between the devices.

The present disclosure is directed to, inter alia, the technical problem of configuring multiple devices for participation in an audio/video conference session. More specifically, the present disclosure is directed to techniques for providing a digital watermark that is visible by a camera of an associated computing device to convey an audio/video conferencing unique identifier to the device. The techniques utilize various hardware components and other forms of previously input information to analyze the digital watermark to obtain authentication information that can be used to join the audio/video conference session. The benefit of such techniques is that the users are not required to manually configure each device to be added to the audio/video conference session. Instead, this digital watermark can be detected (e.g., scanned) and the authentication and joining of the audio/video conference session can be performed automatically thereafter.

Figure 1:
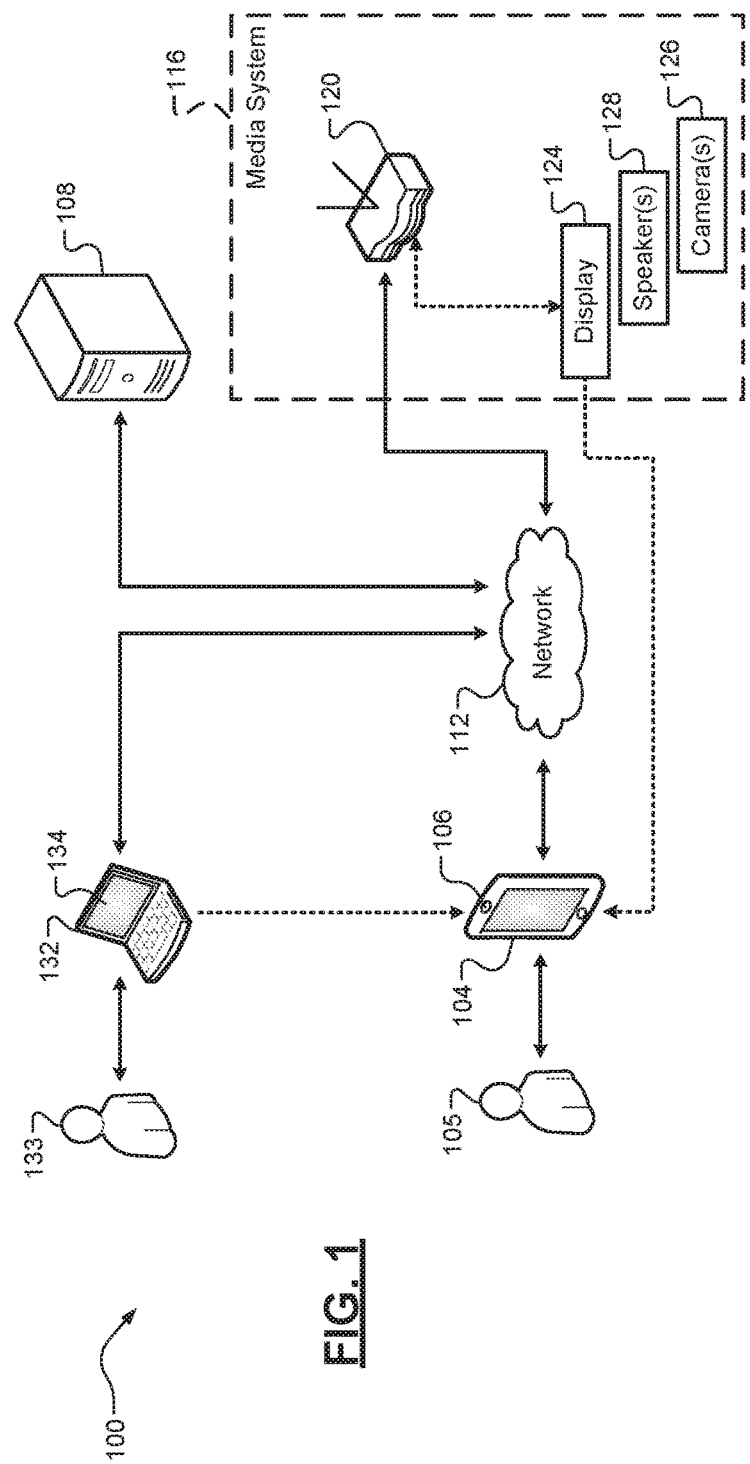
FIG. 1 is a diagram of an example computing network according to some implementations of the present disclosure.

Referring now to FIG. 1, a diagram of an example computing network 100 is illustrated. The computing network 100 can include a first computing device 104 that is configured to communicate with a remote server 108 via a network 112. The first computing device 104 can be a mobile computing device, such as a laptop computer, a tablet computer, or a mobile phone, and can include a camera 106. The server 108 can be configured to host and coordinate an audio/video conference session involving the first computing device 104. The phrase "audio/video conference session" as used herein can refer to any real-time communication session between multiple computing devices. The network 112 can be a local area network (LAN), a wide area network (WAN), e.g., the Internet, or a combination thereof. Both the first computing device 104 and the server 108 can be configured to perform at least a portion of the techniques of the present disclosure.

In some implementations, the computing network 100 can include a computing system 116 associated with a conference room. The computing system 116 is hereinafter referred to as "media system 116." The media system 116 can include an intermediate computing device 120 (e.g., a wireless access point) configured for communication via the network 112. The media system 120 can also include a non-smart display 124 (e.g., a television or projector/screen) and, in some implementations, a set of cameras 126 and a set of speakers 128. The intermediate computing device 120 can be connected (wired or wirelessly) to at least the non-smart display ("display") 124. In this manner, the intermediate computing device 120 can receive information (e.g., video signals) as part of an audio/video conference session for display at the non-smart display 124. The intermediate computing device 120 could also be connected to the set of cameras 126 and could transmit information (e.g., video signals) to other devices as part of the audio/video conference session.

In some implementations, the computing network 100 can include a second computing device 132. Similar to the first computing device 104, the second computing device 132 can be a mobile computing device, such as a laptop computer, a tablet computer, or a mobile phone, and can include a display 134. The display 134 can be configured to display the digital watermark of the present disclosure. The first computing device 104 can be associated with a first user 105 and the second computing device 132 can be associated with a different second user 133. While not explicitly referenced, it will be appreciated that the first computing device 104 also includes a display and the second computing device 132 also includes a camera, such that both devices 104, 132 are capable of fully participating in an audio/video conference session.

In one example scenario, the first computing device 104 has already joined an audio/video conference session, e.g., with one or more other computing devices. This initial joining of the audio/video conference session could be coordinated and hosted by the server 108. During the audio/video conference session, the user 105 of the first computing device 104 may change locations, e.g., from their desk to the conference room associated with the media system 116. When the user 105 enters the conference room, she/he can align the camera 106 of the first computing device 104 with the display 124 of the media system 116. The display 124 can be displaying the digital watermark, and the first computing device 104 can detect the digital watermark using its camera 106. This detection can be done without any input (e.g., selection of a picture capture button) from the user 105 other than aligning the camera 106 with respect to the display 124. The first computing device 104 can already be utilizing its camera 106 as part of the audio/video conference session. This provides for quick and efficient addition of other devices to the audio/video conference session.

As previously discussed, the digital watermark can be any suitable visual indicator that can be used to convey a unique identifier to the first computing device 104. In one implementation, the digital watermark is a QR code that cannot be seen by the human eye (e.g., an IR QR code). This digital watermark can be displayed by the display 124 whenever the media system 116 is powered on and not currently connected to another audio/video conference session. This can also be referred to as a standby or idle mode. Other information could also be displayed during this standby mode, such as calendar information (date, time, etc.), location/GPS information, weather/forecast information, and/or other identifying information for the media system 116 (e.g., Conference Room A). Once the digital watermark is detected by the first computing device 104, the first computing device 104 can determine a unique identifier for the media system 116.

This unique identifier, for example, can be extracted from a specific portion of the digital watermark (e.g., a data portion of a QR code). The unique identifier can then be used by the first computing device 104 to coordinate the addition of the media system 116 to the ongoing audio/video conference session. This can include, for example, transmitting the unique identifier or some command to the server 108, which can cause the server 108 to coordinate the addition of the media system 116 to the audio/video conference session. In some implementations, this addition of the media system 116 to the audio/video conference session will give the user 105 of the first computing device 104 control of the media system 116. For example, the video stream(s) from other devices in the audio/video conference session that are/were being displayed at the first computing device 104 can be transferred to the display 120. Similarly, camera and/or speaker/audio functions can be transferred from the first computing device 104 to the media system 116.

In this conference room scenario, the first computing device 104 may also not be currently participating in an audio/video conference session. Instead, the user 105 may arrive to the conference room early and, using the techniques discussed above, can gain control of the media system 116. In one implementation, this could launch a videoconferencing application at the media system 116. For example, the user's calendar information, including upcoming/scheduled audio/video conference sessions, could be displayed on the display 120. This information could be obtained via an account associated with the user 105. The user 105 could then, via the media system 116 or their computing device 104, join one of the upcoming/scheduled audio/video conference sessions with minimal input (e.g., a single click). Thus, no additional configuration is required to utilize the media system 116 during the audio/video conference session.

In another example scenario, the first computing device 104 can interact with the second computing device 132. The first computing device 104 can be either already participating in the audio/video conference session or the users 105 and/or 133 may wish to establish or initiate the audio/video conference session between the devices 104, 132. The second computing device 132 can be displaying the digital watermark via its display 134. The digital watermark could be displayed, for example, by a specific videoconferencing application. It will be appreciated, however, that the digital watermark could be displayed as part of any suitable display by the second computing device (a lock screen, a home screen, etc.). The digital watermark could also be displayed in response to an explicit input by the user 133 of the second computing device 132, e.g., opening the videoconferencing application.

Similar to the previous example scenario, the first computing device 104 can detect the digital watermark using its camera 106. The unique identifier for the second computing device 132 can be obtained and used to coordinate the establishment/initiation of the audio/video conference session or, if already in progress, the addition of the second computing device to the audio/video conference session. As previously discussed, this can include transmitting the unique identifier or some command to the server 108, which could then coordinate the initiation of the audio/video conference session or the addition of the second computing device 132 to the in-progress audio/video conference session. In other implementations, the unique identifier could be utilized by the first computing device 104 to add the second computing device 132 to a list of preferred conferencing partners. For example, additional information could be obtained from the server 108 using the unique identifier, which could then be stored and utilized by the first computing device 104 in the future.

Figure 2:
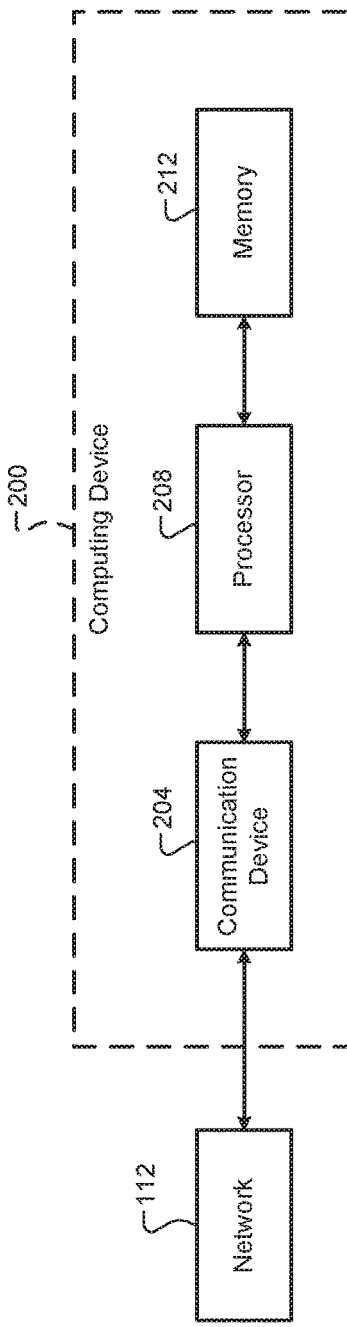
FIG. 2 is a functional block diagram of an example computing device of the computing network of FIG. 1.

Referring now to FIG. 2, a functional block diagram of an example computing device 200 is illustrated. The computing device 200 can be representative of one or more of the first computing device 104, the server 108, the intermediate computing device 120, and the second computing device 132. It will be appreciated, however, that each of these components could have the same or a slightly different configuration (e.g., the first and second computing devices 104, 132 can include displays, such as display 134, whereas the server 108 and the intermediate computing device 120 may not have displays). The computing device 200 can include a communication device 204 (e.g., a transceiver), a processor 208, and a memory 212. The term "processor" as used herein can refer to both a single processor and two or more processors operating in a parallel or distributed architecture. The memory 212 can be any suitable non-transitory computer-readable storage medium (flash, hard disk, etc.) configured to store information at the computing device 200, such as a set of instructions that, when executed by the processor 208, causes the computing device 200 to perform at least a portion of the techniques of the present disclosure.

Figure 3:
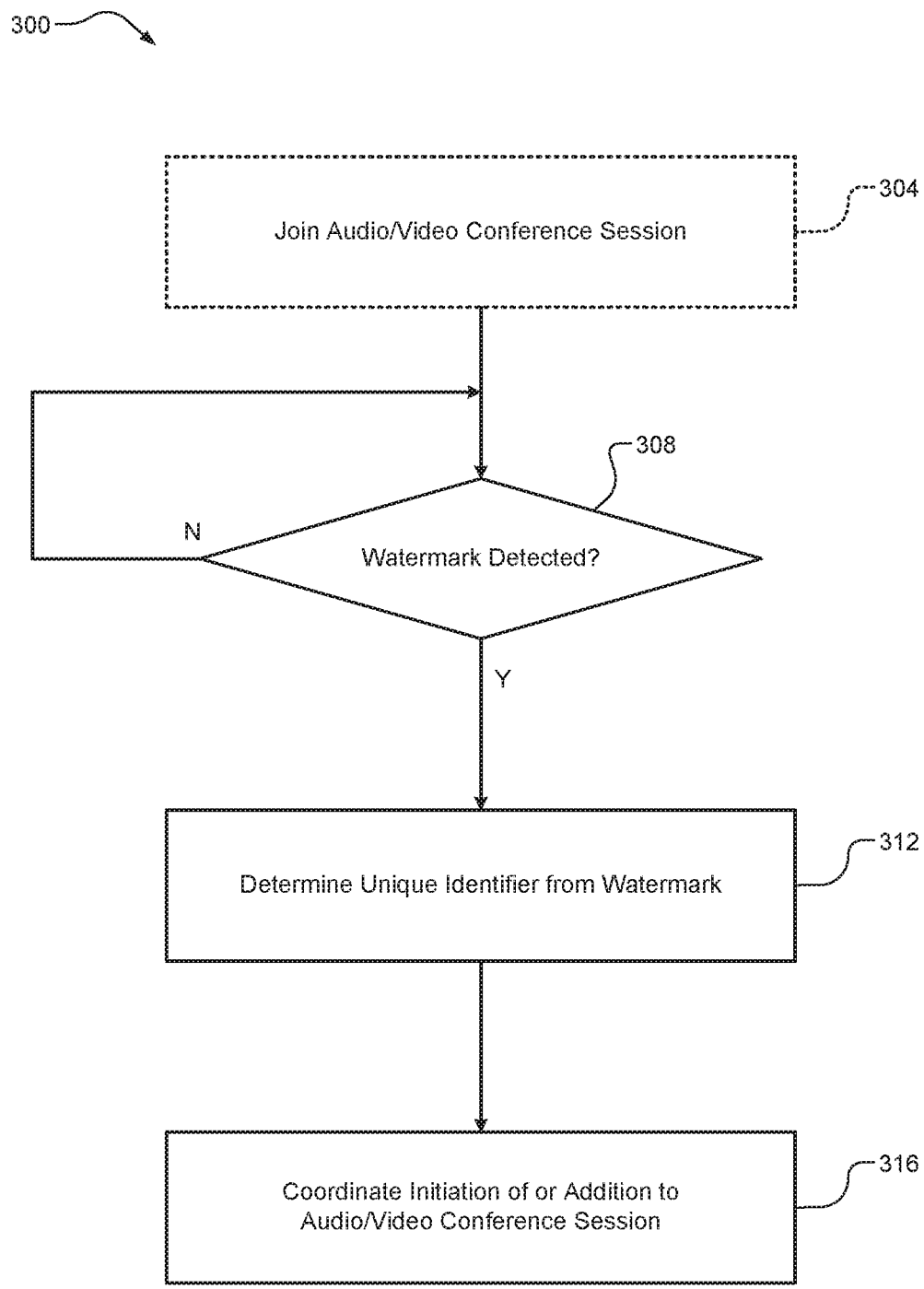
FIG. 3 is a flow diagram of an example device pairing technique using digital watermarking according to some implementations of the present disclosure.

Referring now to FIG. 3, a flow diagram of an example device pairing technique 300 using digital watermarking is illustrated. At 304 (optional), the first computing device 104 may join an audio/video conference session. At 308, the first computing device 104 can, using its camera 106, detect a digital watermark displayed by a display. As previously discussed, this display could be the display 124 of the media system 116 or the display 134 of the second computing device 132. At 312, the first computing device 104 can, using the digital watermark, determine a unique identifier associated with the media system 116 or the second computing device 132. At 316, the first computing device 104 can coordinate the addition of the media system 116 to the ongoing audio/video conference session or the initiation of the audio/video conference session between the first and second computing devices 104, 132. This coordinating, for example, can include the first computing device 104 transmitting a command to the server 108, which can then act accordingly. The technique 300 can then end or return to 304.

"Device pairing" is specifically discussed herein with respect to devices joining an audio/video conference session. For example, when the second computing device 132 is added to the list of preferred conferencing partners for the first computing device 104, the first and second computing devices 104, 132 may also be referred to as "paired" for future audio/video conferencing purposes. It will be appreciated, however, that the digital watermarking techniques discussed herein could be extended to any device pairing processes. More particularly, the digital watermark could be used to convey alternate or additional information to the scanning/receiving device, such as configuration information for a particular communication protocol (Bluetooth, WiFi Direct, etc.). Other information could also be conveyed, such as contact information or a user profile for the user 133 of the second computing device 132. By making the digital watermark not visible to the human eye, the digital watermark does not negatively affect the appearance of the displayed content but still provides functionality.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies.

Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   establishing a connection to and participating in, by a first user computing device, a conference session hosted by a remote computing device; and
   during an established conference session:
      detecting, using a camera of the first user computing device, a digital watermark displayed by a display of a computing system that is distinct from the first user computing device and is not participating in the conference session;
      determining, by the first user computing device, a unique identifier for the computing system based on the digital watermark; and
      enabling, by the first user computing device, an addition of the computing system to the conference session based on the unique identifier.

2. The method of claim 1, wherein the digital watermark is displayed during a standby mode of the computing system during which the computing system is not actively connected to other computing devices.

3. The method of claim 1, wherein detecting the digital watermark comprises detecting a quick-response (QR) code and the QR code includes the unique identifier.

4. The method of claim 1, wherein the digital watermark is an infrared (IR) digital watermark.

5. The method of claim 1, further comprising, during the established conference session:
   capturing, by the camera of the first user computing device, video data of a user; and
   transmitting, by the first user computing device, the video data to a second user computing device, wherein the second user computing device is remote from the first user computing device and the computing system.

6. The method of claim 1, wherein the digital watermark includes at least one of configuration information for a particular communication profile, contact information, or a user profile for a user associated with the remote computing device.

7. The method of claim 1, wherein the conference session is an audio conference session or a video conference session.

8. A system comprising:
   one or more processors; and
   a memory with instructions stored thereon that, when executed by the one or more processors, cause the one or more processors to perform operations comprising:
      establishing a connection to and participating in, by a first user computing device, a conference session hosted by a remote computing device; and
      during an established conference session:
         detecting, using a camera of the first user computing device, a digital watermark displayed by a display of a computing system that is distinct from the first user computing device and is not participating in the conference session;
         determining, by the first user computing device, a unique identifier for the computing system based on the digital watermark; and
         enabling, by the first user computing device, an addition of the computing system to the conference session based on the unique identifier.

9. The system of claim 8, wherein the digital watermark is displayed during a standby mode of the computing system during which the computing system is not actively connected to other computing devices.

10. The system of claim 8, wherein detecting the digital watermark comprises detecting a quick-response (QR) code and the QR code includes the unique identifier.

11. The system of claim 8, wherein the digital watermark is an infrared (IR) digital watermark.

12. The system of claim 8, wherein the instructions further cause the one or more processors to perform operations comprising:
   capturing, by the camera of the first user computing device, video data of a user; and
   transmitting, by the first user computing device, the video data to a second user computing device, wherein the second user computing device is remote from the first user computing device and the computing system.

13. The system of claim 8, wherein the digital watermark includes at least one of configuration information for a particular communication profile, contact information, or a user profile for a user associated with the remote computing device.

14. The system of claim 8, wherein the conference session is an audio conference session or a video conference session.

15. A non-transitory computer readable medium with instructions that, when executed by one or more computers, cause the one or more computers to perform operations, the operations comprising:
   establishing a connection to and participating in, by a first user computing device, a conference session hosted by a remote computing device; and
   during an established conference session:
      detecting, using a camera of the first user computing device, a digital watermark displayed by a display of a computing system that is distinct from the first user computing device and is not participating in the conference session;
      determining, by the first user computing device, a unique identifier for the computing system based on the digital watermark; and
      enabling, by the first user computing device, an addition of the computing system to the conference session based on the unique identifier.

16. The computer-readable medium of claim 15, wherein the digital watermark is displayed during a standby mode of the computing system during which the computing system is not actively connected to other computing devices.

17. The computer-readable medium of claim 15, wherein detecting the digital watermark comprises detecting a quick-response (QR) code and the QR code includes the unique identifier.

18. The computer-readable medium of claim 15, wherein the digital watermark is an infrared (IR) digital watermark.

19. The computer-readable medium of claim 15, wherein the operations further comprise:
   capturing, by the camera of the first user computing device, video data of a user; and transmitting, by the first user computing device, the video data to a second user computing device, wherein the second user computing device is remote from the first user computing device and the computing system.

20. The computer-readable medium of claim 15, wherein the digital watermark includes at least one of configuration information for a particular communication profile, contact information, or a user profile for a user associated with the remote computing device.

\* \* \* \* \*